(12) United States Patent
Gingrich, III et al.

(10) Patent No.: US 9,780,723 B2
(45) Date of Patent: Oct. 3, 2017

(54) TERMINAL FOR SOLAR JUNCTION BOX

(71) Applicant: Tyco Electronics Corporation, Berwyn, PA (US)

(72) Inventors: Charles Raymond Gingrich, III, Mechanicsburg, PA (US); Matthew Edward Mostoller, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 23 days.

(21) Appl. No.: 14/753,725

(22) Filed: Jun. 29, 2015

(65) Prior Publication Data

US 2016/0380587 A1 Dec. 29, 2016

(51) Int. Cl.
*H05K 5/00* (2006.01)
*H02S 40/34* (2014.01)

(52) U.S. Cl.
CPC .................... *H02S 40/34* (2014.12)

(58) Field of Classification Search
CPC ........................................ H02S 40/34
USPC .......................................... 136/244
See application file for complete search history.

(56) References Cited

U.S. PATENT DOCUMENTS

| | | | |
|---|---|---|---|
| 6,696,641 B2 * | 2/2004 | Sasaoka ................. | H02S 40/34 174/50 |
| 2006/0283628 A1 * | 12/2006 | Feldmeier ......... | B32B 17/10036 174/260 |
| 2006/0289053 A1 * | 12/2006 | Nieleck ................... | H02S 40/34 136/244 |
| 2009/0275231 A1 * | 11/2009 | Richter .................. | H01R 13/17 439/535 |
| 2010/0039781 A1 * | 2/2010 | Tai .......................... | H02S 40/34 361/752 |
| 2010/0218802 A1 * | 9/2010 | Quiter .................. | H01R 4/4827 136/244 |
| 2011/0081808 A1 * | 4/2011 | Ebihara .................. | H01R 4/185 439/626 |
| 2011/0108085 A1 * | 5/2011 | Quiter .............. | H01L 31/02013 136/244 |
| 2011/0168228 A1 * | 7/2011 | McGreevy .............. | H02S 40/34 136/244 |
| 2011/0240088 A1 * | 10/2011 | Ecob ...................... | B29C 45/00 136/244 |

(Continued)

FOREIGN PATENT DOCUMENTS

CN  203 942 492 U  11/2014
CN  204 103 857 U   1/2015

(Continued)

OTHER PUBLICATIONS

International Search Report, International Application No. PCT/US2016/038457, International Filing Date, Jun. 21, 2016.

*Primary Examiner* — Hung V Ngo

(57) ABSTRACT

A solar junction box for a solar panel having at least one photovoltaic cell and a foil electrically connected to the at least one cell includes a housing having a base and walls defining a cavity. The housing is configured to be mounted to the solar panel. The base has at least one foil opening. A protection device is received in the cavity. A terminal is received in the cavity. The terminal has a protection device contact terminated to the protection device and a foil contact being crimped to the foil to electrically connect the terminal to the foil.

19 Claims, 3 Drawing Sheets

(56) References Cited

U.S. PATENT DOCUMENTS

| | | | |
|---|---|---|---|
| 2012/0048615 A1* | 3/2012 | Masumoto | H02S 40/34 174/547 |
| 2012/0122336 A1* | 5/2012 | Eusterholz | H01L 31/02013 439/502 |
| 2013/0146118 A1* | 6/2013 | Kelley | H05K 5/02 136/244 |
| 2013/0276856 A1* | 10/2013 | Mills | H01R 13/6641 136/244 |
| 2015/0237752 A1* | 8/2015 | Craig | H02B 1/26 174/535 |
| 2016/0380585 A1* | 12/2016 | Gingrich, III | H02S 40/34 174/520 |

FOREIGN PATENT DOCUMENTS

| | | |
|---|---|---|
| EP | 1 729 369 A2 | 12/2006 |
| EP | 2 960 996 A1 | 12/2015 |
| JP | 2012 182365 A | 9/2012 |

* cited by examiner

TERMINAL FOR SOLAR JUNCTION BOX

BACKGROUND OF THE INVENTION

The subject matter herein relates generally to solar junction boxes for solar panels.

Photovoltaic (PV) modules or arrays, such as solar panels, produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV systems, special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected in series with thin contacts, such as a foil. The foil is terminated to a junction box, which may electrically connect groups of the PV cells and/or solar panels.

The junction box is typically connected to the back side of the solar panel, such as to a backsheet. The foil is terminated to a corresponding terminal in the junction box. Typically, the foil is connected to the terminal via a mechanical spring clip. The spring clips can lose their mechanical properties, such as in the elevated temperature environment of the solar application. Other known solar junction boxes have terminals that are soldered or welded to the foil. However, the soldering process can be slow and tedious and the welding process requires special equipment to weld the foil to the terminal. Additionally, the foils may be routed in various different directions relative to the solar panel, such as side-to-side, top-to-bottom, bottom-to-top, and the like. The junction box must be oriented in a direction that corresponds to the foil axis direction of the foil for proper termination to the terminal because the terminal is limited to receiving the foil in a single direction. Conventional solar junction boxes only accept the foil from one direction. A need remains for a solar junction box capable of overcoming the shortcomings of conventional solar junction boxes.

BRIEF DESCRIPTION OF THE INVENTION

In one embodiment, a solar junction box is provided for a solar panel having at least one photovoltaic cell and a foil electrically connected to the at least one cell. The solar junction box includes a housing having a base and walls defining a cavity. The housing is configured to be mounted to the solar panel. The base has at least one foil opening. A protection device is received in the cavity. A terminal is received in the cavity. The terminal has a protection device contact terminated to the protection device and a foil contact being crimped to the foil to electrically connect the terminal to the foil.

In another embodiment, a solar junction box is provided for a solar panel having at least one photovoltaic cell and a foil electrically connected to the at least one cell. The solar junction box includes a housing having a base and walls defining a cavity. The cavity extends along a primary axis and a secondary axis generally perpendicular to the primary axis. The base has at least one foil opening. The housing is configured to be mounted to the solar panel. A protection device is received in the cavity. A terminal is received in the cavity. The terminal has a protection device contact terminated to the protection device and a foil contact being crimped to the foil to electrically connect the terminal to the foil. The foil opening and the foil contact are configured to receive the foil when the foil extends along the primary axis and the foil opening and the foil contact are configured to receive the foil when the foil extends along the secondary axis.

DETAILED DESCRIPTION OF THE INVENTION

Figure 1:
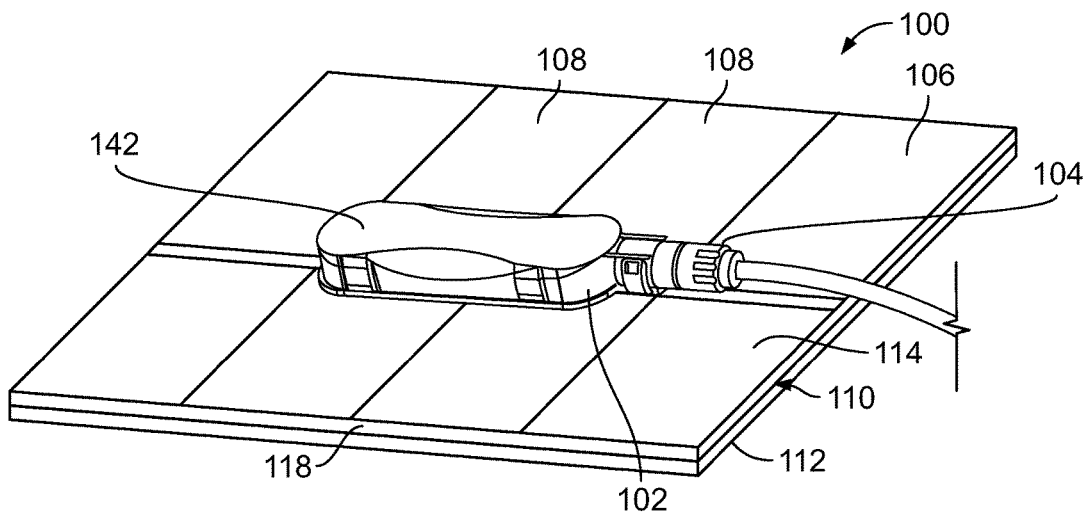
FIG. 1 illustrates a photovoltaic (PV) system formed in accordance with an exemplary embodiment.

FIG. 1 illustrates a photovoltaic (PV) system 100 formed in accordance with an exemplary embodiment. The PV system 100 includes one or more solar junction boxes 102 (one shown in FIG. 1), which may be electrically connected by connector assemblies 104 (e.g., cable connector assemblies). The PV system 100 includes a plurality of PV components 106. In an exemplary embodiment, the PV components 106 may be any type of PV components, such as PV modules or arrays that are used to generate electricity, such as solar panels, or other PV components used within the PV system 100 such as power storage devices, sensors, controllers, and the like. In the illustrated embodiment, the PV components 106 are solar panels and may be referred to hereinafter as solar panels 106. The solar panels 106 have a plurality of PV cells 108 configured to generate electricity.

The connector assemblies 104 may be coupled solar junction boxes 102 of the same solar panel 106 or solar junction boxes 102 of different solar panels 106. The connector assemblies 104 transmit power and/or data along the transmission path between the PV components 106.

In an exemplary embodiment, the solar panel 106 includes a semiconductor layer 110 sandwiched between a glass layer 112 and a backsheet 114. The semiconductor layer 110 includes the cells 108 and conductors, such as conductive foils 116 (shown in FIG. 2), connecting the cells 108 in series. Groups of the cells 108 may be electrically connected to the corresponding solar junction box 102. For example, the foil 116 may be terminated to a corresponding terminal in the solar junction box 102. In an exemplary embodiment, the solar junction box 102 may be mounted to the backside of the solar panel 106, either at or near an edge 118 of the solar panel 106, or at another location, such as at or near a center of the solar panel 106. The foils 116 may extend from the edge to the solar junction box 102 or may extend through the backsheet 114 at any location, such as through an opening or slot in the backsheet 114.

The glass layer 112 is positioned above the semiconductor layer 110 and allows sunlight to pass therethrough to the cells 108. The backsheet 114 is positioned below the semiconductor layer 110. The backsheet 114 may be a plastic layer. Alternatively, the backsheet 114 may be manufactured from another material. For example, the backsheet 114 may be another glass layer. For example, in some various embodiments, the solar panel 106 may be a bifacial solar panel configured to receive sunlight from both sides of the solar panel 106. For example, the backside (backsheet 114) may receive reflective sunlight. The foils 116 from the semiconductor layer 110 exit the solar panel 106 at foil exits. The foil exits may be between the glass layer 112 and the backsheet 114 or may be through the backsheet 114. The foils 116 are routed to the solar junction box 102, which, in the illustrated embodiment, is mounted to the backside of the solar panel 106, such as to the backsheet 114. Each foil 116 extends along a foil axis, which is generally the longitudinal axis of the foil 116. The foil 116 may be routed in any direction along the solar panel 106, such as up the panel, down the panel, side-to-side across the panel, transverse across the panel, longitudinally, laterally, or otherwise. The foil axis may be parallel to one of the edges 118; however the foil axis may be transverse to the edges 118 in alternative embodiments. Additionally, different foils 116 may be routed in different directions.

While FIG. 1 is a bottom perspective view showing the solar junction box 102 mounted to the backsheet 114, in use, the glass layer 112 would be on top or upward facing to face the sun and the solar junction box 102 would be mounted to the backside of the solar panel 106. Other orientations are possible and terms denoting orientation (e.g., top, bottom, up, down, etc.) may be relative to the orientation shown in the particular Figure as opposed to an orientation in use.

Figure 2:
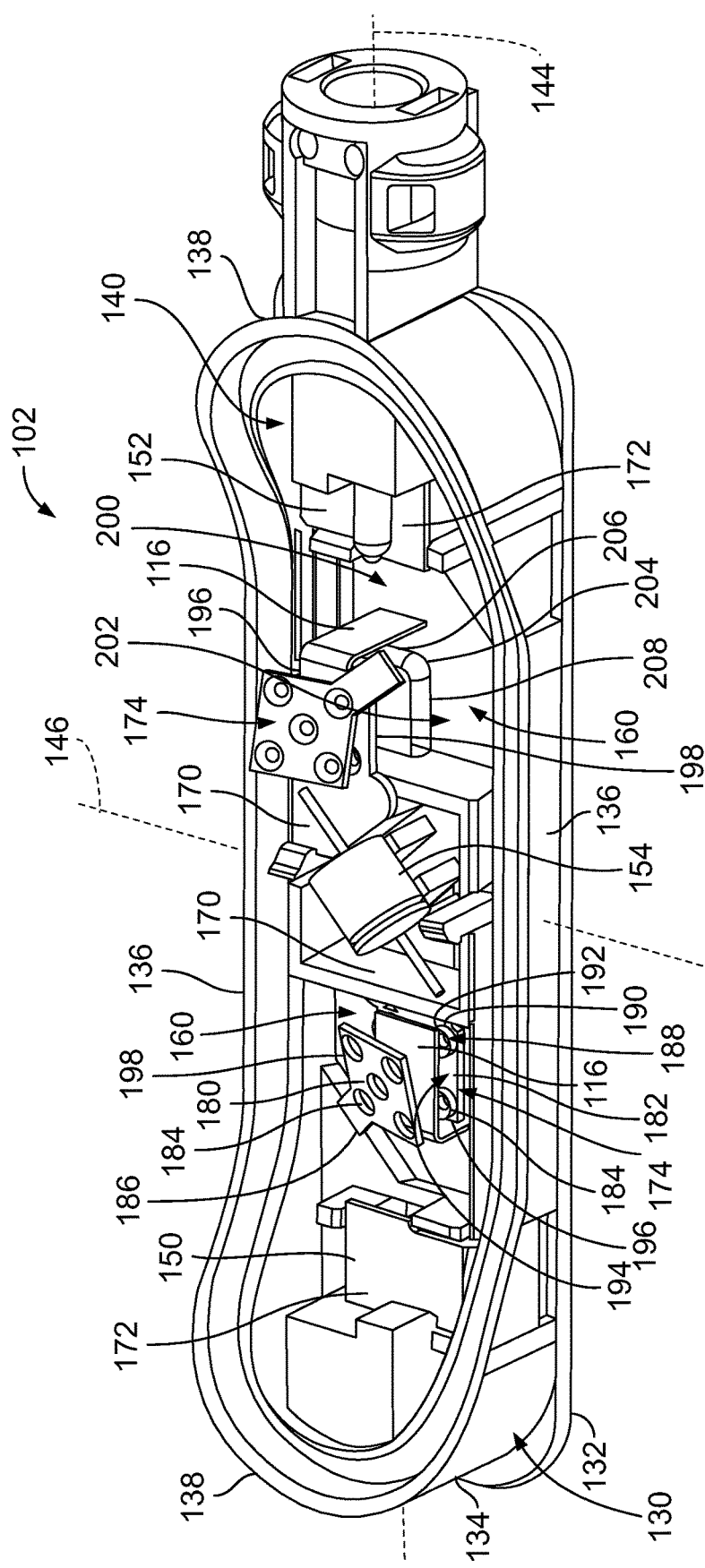
FIG. 2 is a partially exploded view of a solar junction box of the PV system formed in accordance with an exemplary embodiment.

FIG. 2 is a partially exploded view of the solar junction box 102 formed in accordance with an exemplary embodiment. The solar junction box 102 includes a housing 130 configured to be mounted to the solar panel 106. The housing 130 includes a base 132 and a plurality of walls 134 extending from the base 132. Any number of walls 134 may be provided to provide an appropriate shaped housing for the particular application. In the illustrated embodiment, the walls 134 include side walls 136 and end walls 138 extending between the side walls 136. Optionally, the housing 130 may have a rectangular cross section, being long and narrow, with the side walls 136 longer than the end walls 138. Other shapes are possible in alternative embodiments.

The side walls 136 and end walls 138 define a cavity 140 of the housing 130. The solar junction box 102 also includes a lid or cover 142 (shown in FIG. 1). The solar junction box 102 holds electrical components configured to be electrically connected to one or more of the foils 116 in the cavity 140. The cover 142 covers the cavity 140 and electrical components.

The housing 130 is long and narrow and generally extends along a mutually perpendicular primary axis 144 and secondary axis 146. The primary axis 144 may extend in a longitudinal direction and may define a longitudinal axis 144. The secondary axis 146 may extend in a lateral direction and may define a lateral axis 146. In an exemplary embodiment, the side walls 136 are generally parallel to the primary axis 144 and the end walls 138 are generally parallel to the secondary axis 146.

In an exemplary embodiment, the solar junction box 102 includes a positive terminal 150 and a negative terminal 152 in the cavity 140. In an exemplary embodiment, the solar junction box 102 includes a protection device 154 electrically connected to the terminals 150, 152. The protection device 154 may be used to bypass or isolate the solar circuit. For example, the protection device 154 may allow power flow in one direction and restrict power flow in an opposite direction. Optionally, the protection device 154 may limit power flow in a direction from the solar cell 106 and restrict power flow back into the solar cell 106 in certain circumstances. For example, when the solar cell 106 is shaded or damaged and not producing electricity, the protection device 154 may block reverse flow of electricity through the system back to the cells 108, which may cause damage to the cells 108. The protection device 154, as in the illustrated embodiment, may be a bypass diode and may referred to hereinafter as bypass diode 154; however the protection device 154 is not limited to a bypass diode. Other types of protection devices 154 may be used in alternative embodiments. For example, the protection device 154 may be a circuit assembly including a circuit board and other components that protect the system. The protection device 154 may be an isolator to isolate the terminals 150, 152. The protection device may be a MOSFET. The protection device 154 may include a microprocessor or other component to control and/or monitor the system. Optionally, the bypass diode 154 may be positioned between the positive and negative terminals 150, 152. The bypass diode 154 may be electrically connected to each of the terminals 150, 152. Optionally, the bypass diode 154 may be approximately centered between the end walls 138. The solar junction box 102 may include other electrical components in alternative embodiments.

The positive terminal 150 is terminated to a corresponding foil 116 and the negative terminal 152 is terminated to a corresponding foil 116. In an exemplary embodiment, the terminals 150, 152 are configured to receive the foils 116 from different directions (e.g., when the foils 116 run up and down the panel 106 or when the foils 116 run side-to-side across the panel 106). The terminals 150 and/or 152 may be terminated to other components, such as electrical connectors or cables.

The terminals 150, 152 are positioned near corresponding foil openings 160 in the base 132. The foil openings 160 receive corresponding foils 116 and allow the foils 116 to pass into the cavity 140. The foil openings 160 are configured to receive the corresponding foils 116, which may enter the housing 130 from different various directions (e.g., longitudinally or laterally). For example, the foil opening 160 is sized and shaped to receive the foil 116 when (if) the foil is extending along the primary axis 144 and when (if) the foil 116 extends along the secondary axis 146. The foil opening 160 is able to accept the foil 116 from either direction. In the illustrated embodiment, the foil opening 160 is L-shaped to accept the foil 116 from either direction. The foil openings 160 may be ramped and/or curved along the base 132 to allow the foil 116 to transition into the foil opening 160 without damaging the foil 116.

The positive terminal 150 is mounted within the cavity 140 and is configured to be electrically connected to the positive foil 116, the bypass diode 154 and may be electrically connected to another component, such as one of the connector assemblies 104 (shown in FIG. 1). In an exemplary embodiment, the positive terminal 150 includes a protection device contact 170 configured to be terminated to the bypass diode 154. The positive terminal 150 includes a plug contact 172 configured to be terminated to the connector assembly 104 or other components. The positive terminal 150 includes a foil contact 174 configured to be terminated to the foil 116. The terminal 150 may include intermediate segments extending between the protection device contact 170, plug contact 172 and/or foil contact 174.

The foil contact 174 is configured to be crimped to the foil 116 to electrically connect the terminal 150 to the foil 116. In the illustrated embodiment, the foil contact 174 includes a first crimp plate 180 and a second crimp plate 182. The foil 116 is configured to be crimped between the first and second crimp plates 180, 182.

In an exemplary embodiment, the crimp plates 180, 182 are planar plates having extrusion elements 184 extending therefrom. The crimp plates 180, 182 are mechanically connected by a strap 186. The strap 186 may be a metal strap. The first crimp plate 180, strap 186 and second crimp plate 182 may be integrally formed with the other portions of the terminal 150. For example, the terminal 150 may be stamped and formed from a copper or other metal sheet.

In an exemplary embodiment, the extrusion elements 184 have pockets or cups 188 defined by walls 190. Optionally, the extrusion elements 184 may include teeth 192 configured to engage the foil 116. Interstitial spaces 194 are defined between the extrusions elements 184. When the foil contact 174 is crimped to the foil 116, the foil 116 is extruded between the first and second crimp plates 180, 182. The extrusion elements 184 engage the foil 116 and extrude the foil 116 when the foil contact 174 is crimped to the foil 116. The teeth 192 may dig into the foil 116, which may cause the foil 116 to extrude. The foil 116 may be extruded into the cups 188. The foil 116 may be extruded into the interstitial spaces 194 between the extrusion elements 184.

Optionally, the extrusion elements 184 on the first crimp plate 180 may be offset with respect to the extrusion elements 184 on the second crimp plate 182 such that the foil 116 may be extruded between such extrusion elements 184. For example, the extrusion elements 184 of the first crimp plate 180 may be aligned with the interstitial spaces 194 of the second crimp plate 182, and vice versa. Optionally, the extrusions elements 184 may at least partially deform when the foil contact 174 is crimped to the foil 116. Optionally, the crimp plate 180, 182 may at least partially deform when the foil contact 174 is crimped to the foil 116.

The foil contact 174 may have any shape. In the illustrated embodiment, the foil contact 174 has a generally square shape; however, the foil contact 174 may have other shapes in alternative embodiments. The foil contact 174 is oriented within the cavity 140 such that the foil contact 174 is configured to be terminated to the foil 116 when the foil 116 extends into the foil opening 160 along the primary axis 144 and such that the foil contact 174 is configured to be terminated to the foil 116 when the foil 116 extends into the foil opening 160 along the secondary axis 146. As such, the foil contact 174 is configured to be terminated to the foil 116 irrespective of the direction of the foil axis. The foil contact 174 accommodates different orientations of the foil 116 within the system.

In an exemplary embodiment, the foil contact 174 has a first side 196 and a second side 198, which may be generally perpendicular to the first side 196. The first side 196 receives the foil 116 when the foil 116 extends along the primary axis 144, whereas the second side 198 receives the foil 116 when the foil 116 extends along the secondary axis 146. For example, the foil 116 may extend into the space between the crimp plates 180, 182 through the first side 196 or through the second side 198 depending on the orientation of the foil 116. Optionally, the strap 186 may be positioned between the first and second sides 196, 198.

In an exemplary embodiment, when the foil 116 extends to the first side 196, the second side 198 may be open and accessible by a crimping tool used to crimp the foil contact 174 to the foil 116. Alternatively, when the foil 116 is received in the second side 198, the first side 196 may be open and configured to receive the crimp tool for crimping the foil contact 174 to the foil 116.

In an exemplary embodiment, the foil opening 160 is configured to receive the foil 116 when the foil 116 extends along the primary axis 144 and the foil opening 160 is configured to receive the foil 116 when the foil 116 extends along the secondary axis 146. For example, in the illustrated embodiment, the foil opening 160 is L-shaped having a first portion 200 and a second portion 202 meeting at a corner 204. Optionally, the first side 196 of the foil contact 174 may extend along the first portion 200, such as vertically above the first portion 200. The second side 198 of the foil contact 174 may extend along the second portion 202, such as vertically above the second portion 202. The strap 186 may be positioned above the corner 204.

The first portion 200 receives the foil 116 when the foil 116 extends along the primary axis 144 such that the foil 116 passes to the first side 196 of the foil contact 174 for termination and crimping thereto. The second portion 202 receives the foil 116 when the foil 116 extends along the secondary axis 146 such that the foil 116 passes to the second side 198 of the foil contact 174 for termination and crimping thereto. Optionally, the foil 116 may wrap around a first edge 206 into the first portion 200 or may wrap around a second edge 208 into the second portion 202. The edges 206, 208 may meet at the corner 204. The edges 206, 208 may be ramped or curved to avoid damaging the foil 116.

Figure 3:
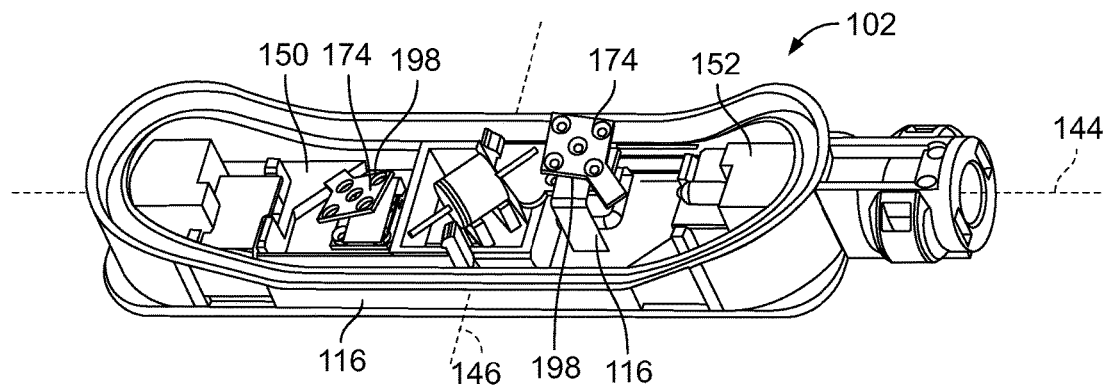
FIG. 3 illustrates positive and negative terminals of the solar junction box receiving corresponding foils.

FIG. 2 illustrates the positive and negative terminals 150, 152 receiving the corresponding foils 116 both in the primary direction (e.g., the foil axes of both foils 116 extend longitudinally). The foils 116 pass through the first sides 196 of the foil contacts 174. However, in other various embodiments, the positive and negative terminals 150, 152 may receive the corresponding foils 116 both in the secondary direction (e.g., the foil axes of both foils 116 extend laterally). For example, FIG. 3 illustrates the positive and negative terminals 150, 152 receiving the corresponding foils 116 both in the secondary direction (e.g., along the secondary axis 146). The foils 116 pass through the second sides 198 of the foil contacts 174. In other various embodiments, the positive terminal 150 may receive the corresponding foil 116 from one direction (e.g., laterally or longitudinally) and the negative terminal 152 may receive the corresponding foil 116 from the other direction (e.g., longitudinally or laterally).

Figure 4:
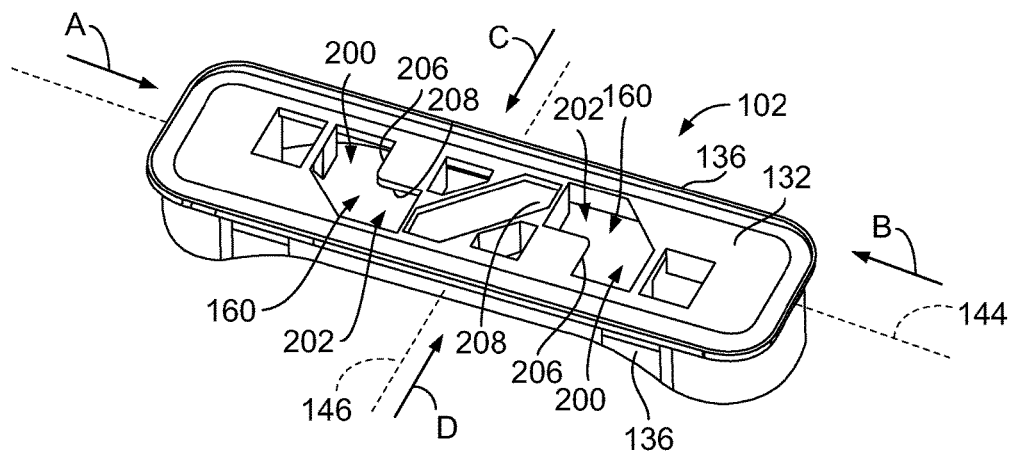
FIG. 4 is a perspective view of the solar junction box showing a base thereof.

FIG. 4 is a perspective view of the solar junction box 102 showing the base 132. The foil openings 160 are illustrated in FIG. 4. The foil openings 160 are generally L-shaped and are defined, at least in part, by the first and second edges 206, 208 along the first and second portions 200, 202. The foils 116 (shown in FIG. 1) may extend into either of the foil openings 160 along the primary axis 144 in the direction of arrow A or in the direction of arrow B and the foils 116 may extend into either of the foil openings 160 along the secondary axis 146 in the direction of arrow C or in the direction of arrow D. In an exemplary embodiment, the first edges 206 are laterally offset (e.g., closer to opposite side walls 136) to allow the foils 116 to route along parallel, offset paths (e.g., adjacent each other).

Figure 5:
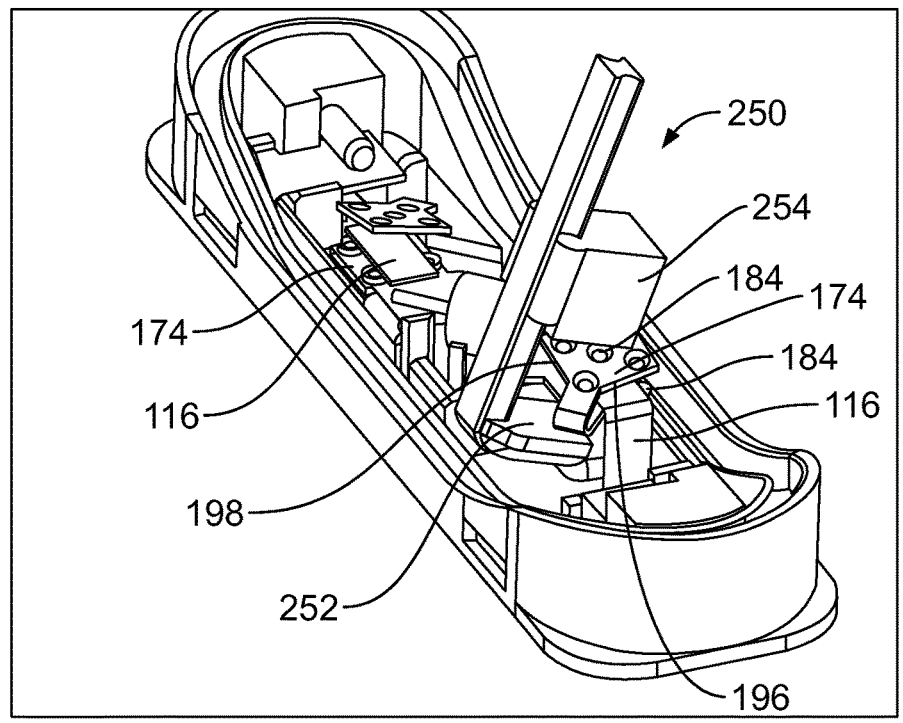
FIG. 5 is a perspective view of the solar junction box showing a crimping tool being loaded into position for crimping.
Figure 6:
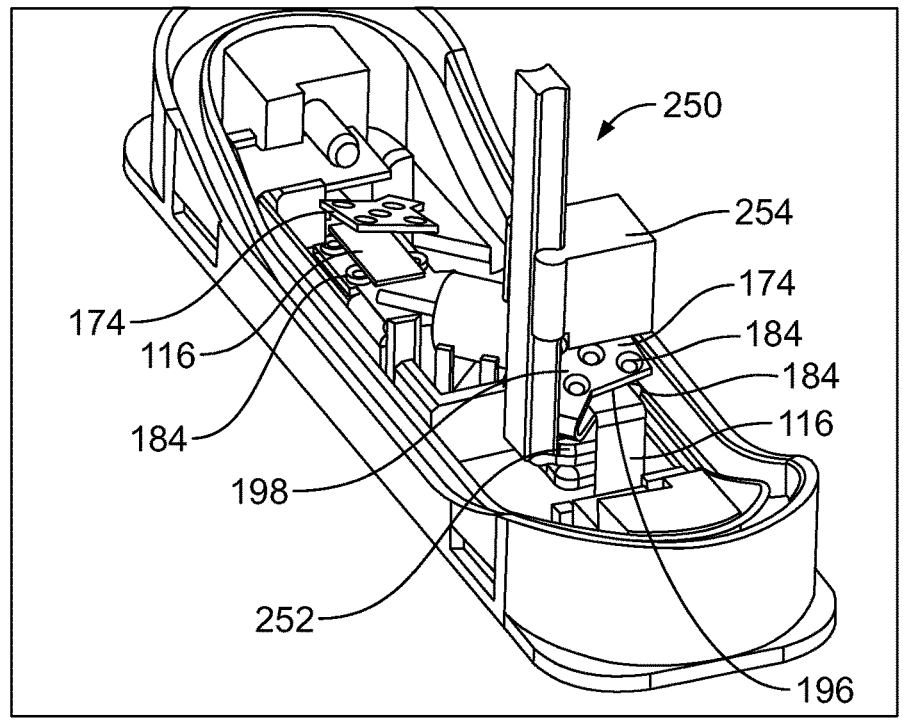
FIG. 6 is a perspective view of the solar junction box showing the crimping tool poised for crimping.

FIG. 5 is a perspective view of the solar junction box 102 showing a crimping tool 250 being loaded into position relative to the foil contact 174 for crimping. FIG. 6 is a perspective view of the solar junction box 102 showing the crimping tool 250 poised for crimping the foil contact 174. The crimping tool 250 may compress and crimp the foil contact 174 and foil 116 to electrically and mechanically terminate the coil 116 to the foil contact 174. The foil 116 may be at least partially extruded during the crimping process. The extrusion elements 184 may extrude the foil 116.

During crimping, if the foil 116 is received in the first side 196 of the foil contact 174, the crimping tool 250 may be aligned with and approach the foil contact 174 from the second side 198. Alternatively, if the foil 116 is received in the second side 198 of the foil contact 174, the crimping tool 250 may be aligned with and approach the foil contact 174 from the first side 196.

The crimping tool 250 may be any type of crimping tool. For example, the crimping tool 250 may include a stationary member 252, such as an anvil, and a movable member 254, such as a ram, movable relative to the stationary member 252. Alternatively, both members 252, 254 may be movable toward each other during crimping. The foil contact 174 and the foil 116 are crimped between the members 252, 254. Optionally, the movable member 254 may be hydraulically actuated, pneumatically actuated, electronically actuated or otherwise forced to move and compress the foil contact 174.

In an exemplary embodiment, the side walls 136 droop inward and have a lower profile than the end walls 138. The side walls 136 provide clearance for the crimping tool 250 to enter the crimping zone. Optionally, the side walls 136 may be positioned below the foil contact 174 to allow easy access to the foil contact 174.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A solar junction box for a solar panel having at least one photovoltaic cell and a foil electrically connected to the at least one cell, the solar junction box comprising:
   a housing having a base and walls defining a cavity, the housing being configured to be mounted to the solar panel, the base having at least one foil opening;
   a protection device received in the cavity;
   a terminal received in the cavity, the terminal having a protection device contact terminated to the protection device, the terminal having a foil contact being crimped to the foil to electrically connect the terminal to the foil, wherein the foil contact includes an extrusion element extending therefrom, the extrusion element engaging the foil and extruding the foil when the foil contact is crimped to the foil.

2. The solar junction box of claim 1, wherein the foil contact includes a first crimp plate and a second crimp plate, the foil being crimped between the first and second crimp plates.

3. The solar junction box of claim 2, wherein the foil contact includes a strap between the first and second crimp plates, mechanically connecting the first and second crimp plates.

4. The solar junction box of claim 1, wherein the foil contact extrudes the foil between first and second crimp plates of the foil contact.

5. The solar junction box of claim 1, wherein the extrusion element includes teeth configured to engage the foil.

6. The solar junction box of claim 1, wherein the extrusion element includes a cup, the foil being extruded into the cup.

7. The solar junction box of claim 1, wherein the foil contact includes a plurality of extrusion elements extending therefrom, the extrusion elements being spaced apart defining interstitial spaces between the extrusion elements, the extrusion elements engaging the foil and extruding the foil into the interstitial spaces when the foil contact is crimped to the foil.

8. The solar junction box of claim 1, wherein the foil contact is oriented within the cavity such that the foil contact is configured to be terminated to the foil when the foil extends into the foil opening along the primary axis and such that the foil contact is configured to be terminated to the foil when the foil extends into the foil opening along the secondary axis.

9. The solar junction box of claim 1, wherein the cavity extends along a primary axis and a secondary axis generally perpendicular to the primary axis, the foil opening being configured to receive the foil when the foil extends along the primary axis and the foil opening is configured to receive the foil when the foil extends along the secondary axis.

10. The solar junction box of claim 9, wherein the foil opening is L-shaped having a first portion and a second portion meeting at a corner, the foil contact being arranged relative to the foil opening with a first side arranged along the first portion and with a second side arranged along the second portion, the first portion receiving the foil when the foil extends along the primary axis such that the foil passes to the first side of the foil contact for termination thereto and the second portion receiving the foil when the foil extends along the secondary axis such that the foil passes to the second side of the foil contact for termination thereto.

11. A solar junction box for a solar panel having at least one photovoltaic cell and a foil electrically connected to the at least one cell, the solar junction box comprising:
   a housing having a base and walls defining a cavity, the cavity extending along a primary axis and a secondary axis generally perpendicular to the primary axis, the base having at least one foil opening, the housing being configured to be mounted to the solar panel;

a protection device received in the cavity;

a terminal received in the cavity, the terminal having a protection device contact terminated to the protection device, the terminal having a foil contact being crimped to the foil to electrically connect the terminal to the foil;

wherein the foil opening and the foil contact are configured to receive the foil when the foil extends along the primary axis and wherein the foil opening and the foil contact are configured to receive the foil when the foil extends along the secondary axis.

12. The solar junction box of claim 11, wherein the foil opening is L-shaped having a first portion and a second portion meeting at a corner, the foil contact being arranged relative to the foil opening with a first side arranged along the first portion and with a second side arranged along the second portion, the first portion receiving the foil when the foil extends along the primary axis such that the foil passes to the first side of the foil contact for termination thereto and the second portion receiving the foil when the foil extends along the secondary axis such that the foil passes to the second side of the foil contact for termination thereto.

13. The solar junction box of claim 11, wherein the foil contact includes a first crimp plate and a second crimp plate, the foil being crimped between the first and second crimp plates.

14. The solar junction box of claim 11, wherein the foil contact extrudes the foil between first and second crimp plates of the foil contact.

15. The solar junction box of claim 11, wherein the foil contact includes an extrusion element extending therefrom, the extrusion element engaging the foil and extruding the foil when the foil contact is crimped to the foil.

16. The solar junction box of claim 15, wherein the extrusion element includes teeth configured to engage the foil.

17. The solar junction box of claim 15, wherein the extrusion element includes a cup, the foil being extruded into the cup.

18. The solar junction box of claim 11, wherein the foil contact includes a plurality of extrusion elements extending therefrom, the extrusion elements being spaced apart defining interstitial spaces between the extrusion elements, the extrusion elements engaging the foil and extruding the foil into the interstitial spaces when the foil contact is crimped to the foil.

19. The solar junction box of claim 11, wherein the foil contact is oriented within the cavity such that the foil contact is configured to be terminated to the foil when the foil extends into the foil opening along the primary axis and such that the foil contact is configured to be terminated to the foil when the foil extends into the foil opening along the secondary axis.

* * * * *